May 10, 1966 R. H. OKADA ETAL 3,250,987
HEMATOCRIT METER
Filed Jan. 4, 1963 2 Sheets-Sheet 1

*INVENTORS*
ROBERT H. OKADA
HERMAN P. SCHWAN
BY

May 10, 1966 R. H. OKADA ET AL 3,250,987
HEMATOCRIT METER
Filed Jan. 4, 1963 2 Sheets-Sheet 2

INVENTORS
ROBERT H. OKADA
HERMAN P. SCHWAN
BY Lawrence R. Brown

3,250,987
HEMATOCRIT METER

Robert H. Okada, 1490 Bairn Drive, Hillsborough, Calif., and Herman P. Schwan, 99 Kynlyn Road, Radnor, Pa.
Filed Jan. 4, 1963, Ser. No. 249,524
6 Claims. (Cl. 324—30)

This application is a continuation-in-part of copending application Serial No. 861,877, filed December 24, 1959, and now abandoned.

This invention relates to instrumentation for determining properties of blood and more specifically it relates to a meter for measuring the volume concentration of red blood cells.

Conventional means for hematocrit readings comprise centrifuge assemblies which separate red blood cells from the plasma. These are subject to some error, however, since complete packing of red cells cannot be achieved easily. Furthermore, the centrifuge requires use in the laboratory for a period of about ten minutes.

It is desirable to provide a simple accurate means of measuring red cell concentration in blood from small samples and with a simple direct reading technique that may be used outside the laboratory at the patient's side.

Therefore, a primary object of the invention is to provide improved instrumentation for measuring blood characteristics.

Another object of the invention is to provide a hematocrit meter which requires small blood samples such as obtained from finger pricks in a matter of seconds.

A further objective of the invention is to produce a simple portable hematocrit meter that accurately measures blood characteristics without damage to blood cells.

The hematocrit meter provided by this invention operates on the principle that red blood cells are electric insulators at a certain range of frequencies and the plasma is a conductor. This permits an electrical conductivity test to produce a hematocrit reading.

In providing an accurate hematocrit reading, several factors must be taken into consideration. It has been found that the blood plasma conductivity is temperature sensitive. Also, the electrical sensing device must be such that it does not damage the blood or introduce errors because of electrode reactions, etc.

Exhaustive tests show that there is a remarkably constant plasma conductivity in normal blood of different persons. Thus any factors which cause changes in conductivity readings as well as abnormal sizes and shapes and number of blood cells may be detected by conductivity measurements. The mathematical probability that these factors counterbalance each other is extremely small.

In accordance with this invention a portable transistorized hematocrit meter is provided which for accurate readings requires a blood sample of only about 0.02 cc. and which can be used at the patient's side with blood produced by a finger prick. The meter measures conductivity of a fixed volume of blood to provide an immediate reading directly calibrated in percent volume concentration of red cells.

A better understanding of the invention may be obtained by reference to the following detailed description of the invention as displayed in the accompanying drawing, wherein.

Figure 1:
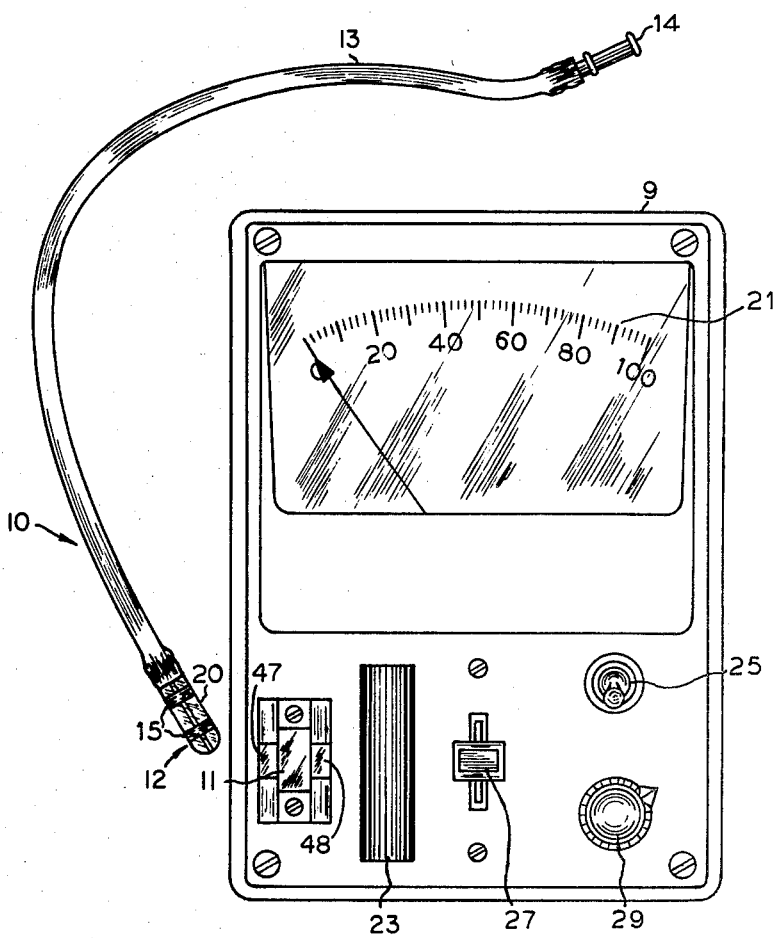
FIG. 1 is a diagrammatic view of a hematocrit instrument as afforded by the invention.

Referring now to FIG. 1, the portable meter body 9 contains the entire instrument except for the external blood sample cell unit 10 which plugs into connector receptable 11 after it has been charged with an appropriate bloodsample. The blood sample comprises about 0.02 cubic centimeters, which may be sucked up into the transparent tube 12 from a finger prick droplet by means of a mouth suction tube 13 attached to mouthpiece 14.

A pair of ring-shaped electrodes 15 are spaced to contact a fixed volume blood sample in the tube 12, and extend from the interior to the exterior of the tube, whereby the interior of the tube forms a blood sample chamber and the electrodes or contacts 15 extend from this chamber to the exterior of the tube to form an electrical circuit of which a blood sample in the chamber between the electrodes will become a part. The electrodes are platinum to prevent any error due to polarizing effects, and they are spaced to permit accurate measurements at the frequency used. The cell viewing area 20 permits visual monitoring of the blood sample to assure that the blood sample does not afford erroneous readings because of uncleanliness, bubbles or unfilled volume.

Figure 3:
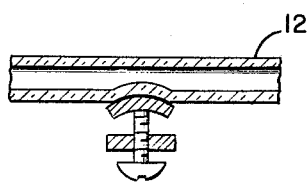
FIG. 3 is a sketch of a volume adjustment device used in accordance with the invention.

In order to practically manufacture the electrode cell assembly with the desired volume precision to allow interchange of various cell units, a mechanical adjustment is provided for changing the volume of the holder through a calibration range. This may be done in a number of ways such as by insertion of a needle-like plunger member into the tube by a screw mechanism, or by physically changing the cell volume with a movable wall as shown in FIG. 3.

In the meter case 9 is the connector receptacle 11 which receives the external blood sample cell unit electrodes 15. The meter scale 21 is calibrated in the volume function of blood cells in percent (often called hematocrit value). Thus, the reading in percent of volume concentration of red blood cells may be directly viewed upon the scale immediately after the cell unit is plugged in.

For permitting operation in an uncontrolled ambient temperature range, a thermally responsive resistor such as General Electric Type R–112 is mounted on the outside of the case in a protective housing 23 to reflect proper ambient temperature compensation in the measurement circuit.

An off-on switch 25 permits instantaneous operation from the transistorized circuits, which can readily be mounted within the body 9 of the instrument, from a self contained battery 26 (FIG. 2) providing a power source and permitting the instrument to be entirely self contained. A calibration lever switch control knob 27 and calibration adjustment knob 29 are provided for assuring that the transistor circuit gain is properly adjusted in the event battery voltage change occurs or other factors (such as amplitude of oscillator output, gain or amplifier and detector) affect the calibration. Thus, a simple calibration may be afforded before every reading, if desired. When switch 25 is turned on, the meter instantly deflects to calibration position and may be adjusted by knob 29.

Figure 2:
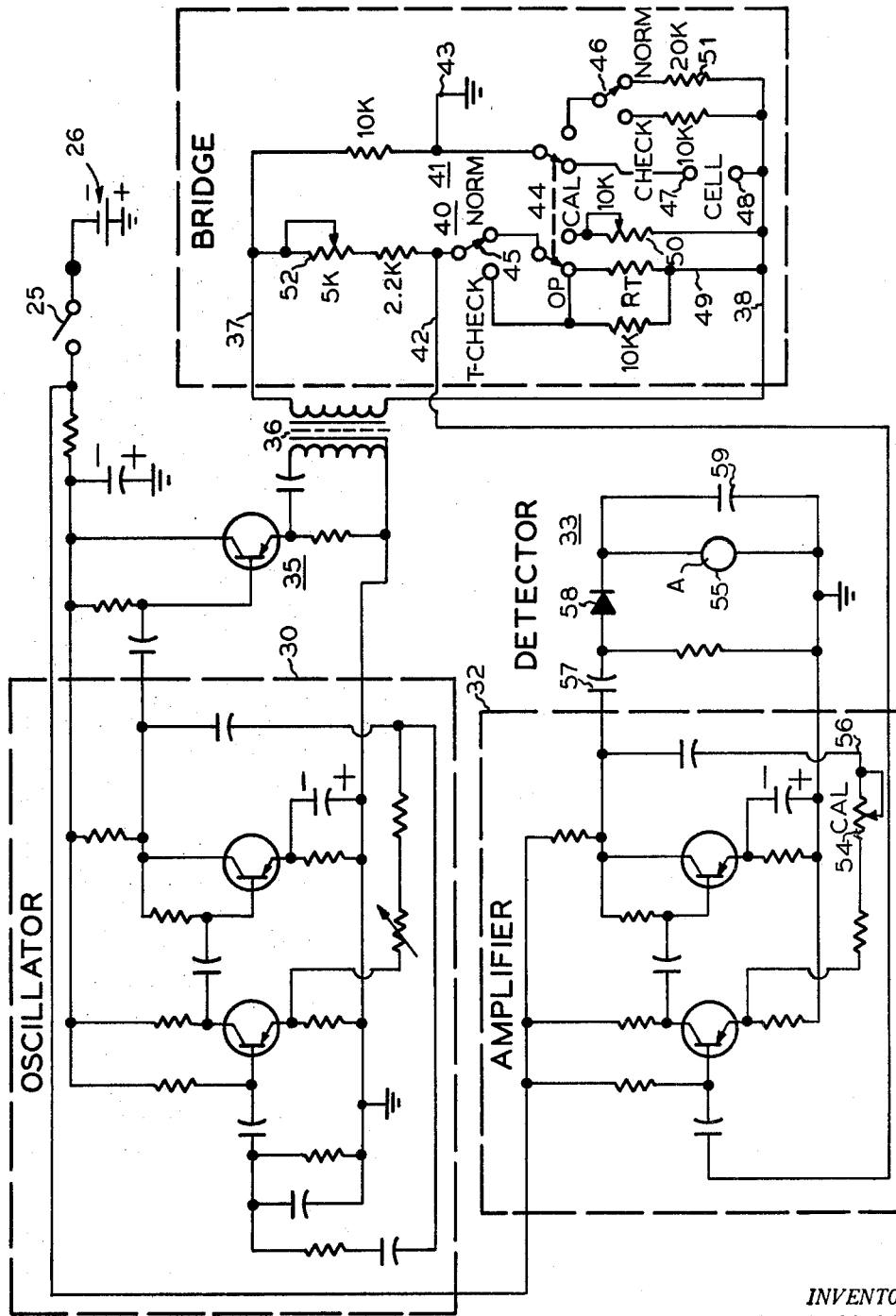
FIG. 2 is a schematic circuit diagram of a specific embodiment of the invention.

The operation of the instrument may be explained by reference to the schematic circuit diagram of FIG. 2. Basically the circuit shown in this embodiment is an A.C. conductivity bridge circuit comprising oscillator 30, bridge network 31, amplifier 32 and detector 33. Transistors are used throughout to permit a low power drain portable instrument. The voltage and power levels are such that damage to the blood sample does not occur, and blood sample does not heat up from passage of measuring current.

An A.C. measurement is used to prevent errors due to electrolytic action between the plasma and electrodes to eliminate contact potential errors. Thus, oscillator circuit 30 is employed to produce A.C. potential to the bridge network. The frequency is tuned to about ten kilocycles per second since higher frequencies tend to produce errors because of capacitive effects exhibited by the red blood cells, and lower frequencies introduce large electrode impedance errors.

It has been found to be important to hold the electrode dimensions within critical limits and to produce electrodes of material such as platinum to reduce polarization impedance errors. (Although other materials have low polarization impedances, they tend to oxidize in time, which pure platinum does not.) The oscillator frequency may be related to the electrode spacing and size together with the cell volume to produce the best dimensions as observed on an empirical basis for accurate readings.

Once the cell dimensions and oscillator frequency are chosen, they remain fixed. To prevent changes in amplitude or frequency of the oscillator as a function of loading, the emitter follower buffering stage 35 is used to feed transformer 36. This transformer provides A.C. drives at lines or leads 37 and 38 of the bridge network so that a constant drive amplitude at ten kilocycle oscillations appears across both branches 40 and 41 of the bridge circuit. The output signals are taken from the bridge network 31 at lines 42 and 43.

The bridge circuit has included calibration networks operated by switches 44 (from knob 27), 45 and 46. The bridge network is shown connected in the normal operating position where $R_T$ is a thermally responsive resistor located in housing 23 on the exterior of the case 9 and connected in one bridge arm 49 for correcting measurements made under varying ambient temperatures.

In the factory the calibration of the circuit shown is made at 24° centigrade. A 10,000 ohm precision resistor is coupled across cell terminals or conductivity sensing connections 47 and 48, and with switch 44 in operate position (OP) the poteniometer 52 is adjusted for a null on meter 55. This balances the bridge for the nominal 24° C. value of the temperature responsive resistor $R_T$.

With switch 44 in calibrate position (CAL), and switch 46 in check position, the bridge is adjusted for a null on the scale 21 of meter 55 by setting resistor 50 to the exact resistance of the temperature responsive resistor $R_T$ and shunt in arm 49, at the aforementioned 24° C., at which the calibration is made.

After this nominal calibration and in the normal position of switch 46, the amplifier gain is calibrated by resistor 54 controlled by knob 29 (FIG. 1) to read 40% of full scale. This can be checked in the field at any time with switch 44 in calibrate position.

Amplifier 32 is a two-stage transistorized A.C. amplifier circuit using feedback in lead 56 to stabilize its gain, and increase its input impedance. It is A.C. coupled by capacitor 57 to the diode detector 58, which permits, with capacitor 59, a D.C. reading upon meter 55. This reading is dependent upon the bridge balance and therefore in calibrated condition is a conductivity measurement of the unknown cell coupled to terminals 47 and 48. By using the described embodiment, very little power is necessary at the cell terminals 47 and 48 and therefore the blood is not altered or damaged by the measurement technique used.

Having described the apparatus afforded by the present invention to provide an improved hematocrit measurement, it will be apparent that novel features are suggested significantly advancing the state of the art, as defined in the following claims:

What is claimed is:

1. An electronic instrument for measuring characteristics of blood comprising in combination, an oscillator circuit, a bridge circuit coupled to the oscillator circuit including a temperature responsive device in one bridge arm and a pair of conductivity sensing connections in another bridge arm, said temperature responsive device being calibrated to correct bridge circuit balance for changes in blood conductivity at different temperatures, a hollow blood cell unit having a pair of electrodes spaced apart to contact a blood sample in said cell unit and of such electrically conductive material to reduce any polarization impedance error in the presence of blood between the electrodes at the particular oscillator frequency chosen, said blood cell unit forming a blood sample chamber in the interior thereof arranged between the electrodes for holding a fixed volume of about .02 cubic centimeters of blood, means for filling the portion of said chamber between the electrodes with a blood sample from a finger prick, means displaying the bridge circuit unbalance in calibrated scale readings indicating the normally encountered percentage volume of red cells in whole blood, and means for connecting said blood cell unit to the pair of conductivity sensing connections in the bridge circuit to produce a conductivity reading for a blood sample contained in said chamber.

2. An instrument as defined in claim 1 wherein said blood cell unit has a transparent viewing area for visually monitoring the blood as it is received into said chamber between the electrodes.

3. An instrument as defined in claim 1 having an oscillator frequency in the order of ten kilocycles per second.

4. An electronic instrument for measuring blood characteristics comprising in combination, a transistorized oscillator circuit tuned to a frequency of about ten kilocycles per second, an emitter follower output stage driven by said oscillator, a transformer coupled to said emitter follower stage and having two output terminals, a bridge circuit coupled to receive operating energy from said transformer and including first and second resistive bridge circuit branches coupled between the transformer output terminals, one arm in the first bridge circuit branch comprising a temperature responsive resistor operable to compensate for measurements made at ambient temperatures varying from a mean value in the order of 24° C., a corresponding arm in the second bridge circuit branch including conductivity sensing connections for receiving a blood sampling chamber and for providing operating current and voltage at a level preventing damage to blood cells, means providing a blood cell unit forming a blood sample chamber and having spaced electrodes adapted for connection to said conductivity sensing connections a transistorized alternating current coupled feedback amplifier circuit having input terminals connected between said two bridge circuit branches to sense and amplify any unbalance of voltage between the branches, a detector circuit coupled to output terminals of said amplifier circuit to provide a rectified direct current output level variable with said unbalance between said circuit branches, and a meter indicating the direct current output magnitude on a scale calibrated to read percent volume of red cells in blood.

5. An electronic instrument for measuring characteristics of whole blood particularly for obtaining hematocrit readings, comprising an alternating current bridge circuit, means including a power supply connected to apply an alternating current potential having a frequency in the order of ten kilocycles per second to said bridge circuit, means forming a blood sample chamber having a volume in the order of a fraction of a cubic centimeter, spaced electrodes in said chamber of an electrically conductive material capable of minimizing polarization impedance error due to flow of electrical current through a blood sample in said chamber, means for viewing the space between said electrodes to assure filling of such space by a blood sample, means for connecting said electrodes into one arm of said bridge circuit for measuring the conductivity of a fresh whole blood sample placed in said chamber, a temperature responsive device connected into said bridge circuit and arranged to correct bridge unbalance for changes in blood conductivity at different temperatures, and meter means connected to said bridge circuit and arranged to display an unbalance therein including a visual indicator calibrated in percent of volume concentraton of red blood cells in whole blood.

6. An instrument for providing a measurement related to the volume concentration of red cells in whole blood, comprising cell unit means having a sample chamber for receiving a blood sample and including two ring-shaped spaced electrodes in said cell unit positioned to contact a blood sample in said chamber, a transparent viewing part on said cell unit means providing for viewing of the chamber between said two electrodes, suction means operatively connected to said cell unit means for drawing a blood sample into said chamber, a resistance measuring device including connections adapted to be coupled to said electrodes and including current limiting means for limiting electrical current flow through a sample in said chamber to an amount incapable of damaging blood cells, said electrodes being formed of non-corrosive material capable of preventing polarization and contact resistance errors, circuit means coupled to said resistance measuring device and operative to pass an alternating sensing current between said electrodes and through a blood sample in said chamber at a frequency in the order of ten kilocycles per second, a meter incorporated in said measuring device, and calibration means operatively connected to said circuit means and said meter to convert alternating current flow through a sample in said chamber into an indication of the volume concentration of red cells in a blood sample.

References Cited by the Examiner

UNITED STATES PATENTS

| | | | |
|---|---|---|---|
| 1,860,397 | 5/1932 | Slawinski | 324—30 |
| 2,555,937 | 6/1951 | Rosenthal et al. | 324—30 |
| 2,886,771 | 5/1959 | Vincent | 324—30 |
| 2,899,636 | 8/1959 | Rubricius | 324—30 |
| 3,086,169 | 4/1963 | Eynon | 324—30 |

FOREIGN PATENTS 825,083  12/1959  Great Britain.

OTHER REFERENCES

Blake, GG.: Journal of Scientific Instruments, Sept., 1945, pp. 174–176.

Hamon, V.: Journal of Scientific Instruments, volume 33, No. 9, Sept., 1956, pp. 329–333.

Rosenthal, Robert: Instruments, volume 23; July, 1950, pp. 664–669.

WALTER L. CARLSON, *Primary Examiner.*

FREDERICK M. STRADER, *Examiner.*